United States Patent [19]
Cuevas et al.

[11] Patent Number: 5,584,504
[45] Date of Patent: Dec. 17, 1996

[54] INFLATOR ASSEMBLY

[75] Inventors: Jess A. Cuevas, Scottsdale; Craig M. Fischer, Mesa; John P. O'Loughlin, Mesa; John D. Skouson, Mesa, all of Ariz.

[73] Assignee: TRW Inc., Lyndhurst, Ohio

[21] Appl. No.: 574,548

[22] Filed: Dec. 19, 1995

Related U.S. Application Data

[63] Continuation of Ser. No. 410,088, Mar. 24, 1995, abandoned.

[51] Int. Cl.⁶ .................................................. B60R 21/26
[52] U.S. Cl. ........................... 280/737; 102/531; 280/741
[58] Field of Search .................................. 280/737, 740, 280/741, 736, 742; 222/3, 5; 102/530, 531

[56] References Cited

U.S. PATENT DOCUMENTS

| | | |
|---|---|---|
| 3,806,153 | 4/1974 | Johnson . |
| 3,836,170 | 9/1974 | Grosch et al. . |
| 3,868,124 | 2/1975 | Johnson . |
| 3,895,821 | 7/1975 | Schotthoefer et al. . |
| 3,910,596 | 10/1975 | Wulbrecht et al. . |
| 3,960,390 | 6/1976 | Goetz . |
| 4,275,901 | 6/1981 | Okada . |
| 5,076,607 | 12/1991 | Woods . |
| 5,078,422 | 1/1992 | Hamilton et al. . |
| 5,131,680 | 7/1992 | Coultas et al. . |
| 5,184,846 | 2/1993 | Goetz . |
| 5,226,668 | 7/1993 | Delonge-Immik et al. . |
| 5,230,531 | 7/1993 | Hamilton et al. . |
| 5,257,819 | 11/1993 | Frantom et al. . |
| 5,301,978 | 4/1994 | Munzel et al. . |
| 5,378,018 | 1/1995 | Ketterer et al. . |
| 5,388,859 | 2/1995 | Fischer et al. . |

FOREIGN PATENT DOCUMENTS

| | | |
|---|---|---|
| 0488937 | 6/1992 | European Pat. Off. . |
| 0559335 | 9/1993 | European Pat. Off. . |
| 2107246 | 5/1972 | France . |
| 2158779 | 6/1973 | France . |
| 2207255 | 6/1974 | France . |

Primary Examiner—Eric D. Culbreth
Attorney, Agent, or Firm—Tarolli, Sundheim, Covell, Tummino & Szabo

[57] ABSTRACT

An apparatus (10) for inflating an air bag includes a container (12) for holding a stored supply of gas under pressure. A body (20) of gas generating material is disposed in a housing (22). A cup shaped closure member (24) blocks a flow of gas through an annular array of passages (28) formed in an end wall (58) of the container (12). The cup shaped closure member (24) has a frangible section (176). Upon ignition of the body (20) of gas generating material, the gas applies pressure against an end wall (166) of the closure member (24) to break the frangible section (176) of the closure member. The pressure applied by the gas against the end wall (166) of the cup shaped closure member (24) moves the closure member toward an opposite end of the container (12). Gas flows from the container (12) through the openings (28) in the end wall of the container into a diffuser (36). The diffuser (36), closure member (24) and housing (22) which holds the body (20) of gas generating material are all connected to the end wall (58) of the container (12).

36 Claims, 6 Drawing Sheets

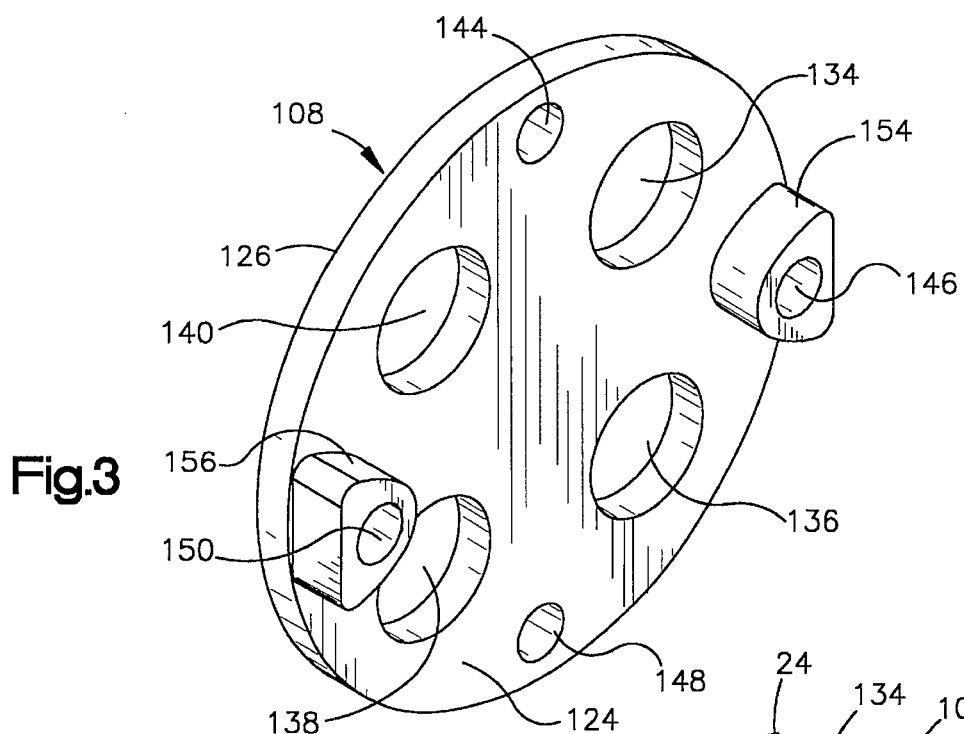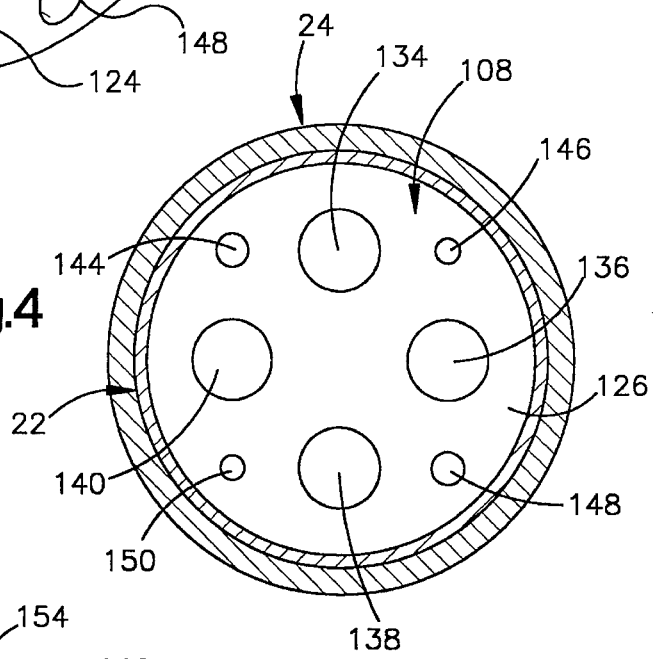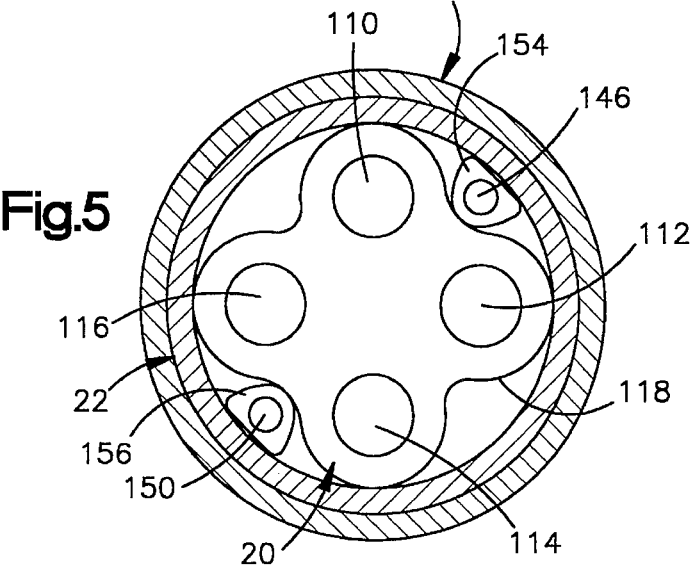

5,584,504

1

INFLATOR ASSEMBLY

This is a continuation of application Ser. No. 08/410,088, filed on Mar. 24, 1995, now abandoned.

BACKGROUND OF THE INVENTION

The present invention relates to an inflator assembly for inflating a vehicle occupant restraint, such as an air bag.

Known inflator assemblies use a combination of stored gas and gas generated by ignition of gas generating material to inflate an air bag. These inflator assemblies include an igniter which is activated to ignite the gas generating material. Upon ignition of the gas generating material, the generated gas provides fluid pressure which ruptures a disk to release the stored gas from the inflator assembly for flow to an air bag. The gas generated by ignition of the gas generating material can then also flow from the inflator assembly to the air bag. Inflator assemblies constructed in this manner are disclosed in U.S. Pat. Nos. 3,806,153 and 3,895,821.

SUMMARY OF THE INVENTION

The present invention relates to an inflator assembly for inflating a vehicle occupant restraint, such as an air bag. The inflator assembly includes a container of stored gas. A housing is connected with the container and holds a quantity of material which produces pressure when at least partially ignited. An igniter for igniting the quantity of pressure producing material is disposed in the housing. The quantity of pressure producing material is preferably a body of ignited material.

A closure member is connected with the container. The closure member blocks a discharge opening for directing gas from the container. The closure member is cup shaped and thus has a closed end and an open end. The closure member at least partially encloses the housing for the quantity of pressure producing material. A diffuser is also connected with the container. The diffuser receives gas from the discharge opening and directs the gas to the vehicle occupant restraint.

Upon activation of the igniter, the pressure producing material is ignited and produces gas pressure. This gas pressure is applied against the closed end of the cup shaped closure member and breaks a frangible section of the closure member. Breaking the frangible section of the closure member disconnects the closure member from the container. The pressure resulting from ignition of the quantity of pressure producing material moves the closure member away from the housing for the ignitable material. The combustion products from the quantity of pressure producing material mix with and heat the stored gas. The stored gas and the combustion products from the quantity of pressure producing material flow through the discharge opening into the diffuser. The gas then flows from the diffuser into the vehicle occupant restraint.

BRIEF DESCRIPTION OF THE DRAWINGS

The foregoing and other objects and features of the present invention will become more apparent to one skilled in the art upon a consideration of the following description of the invention and the accompanying drawings in which.

2

Figure 1:
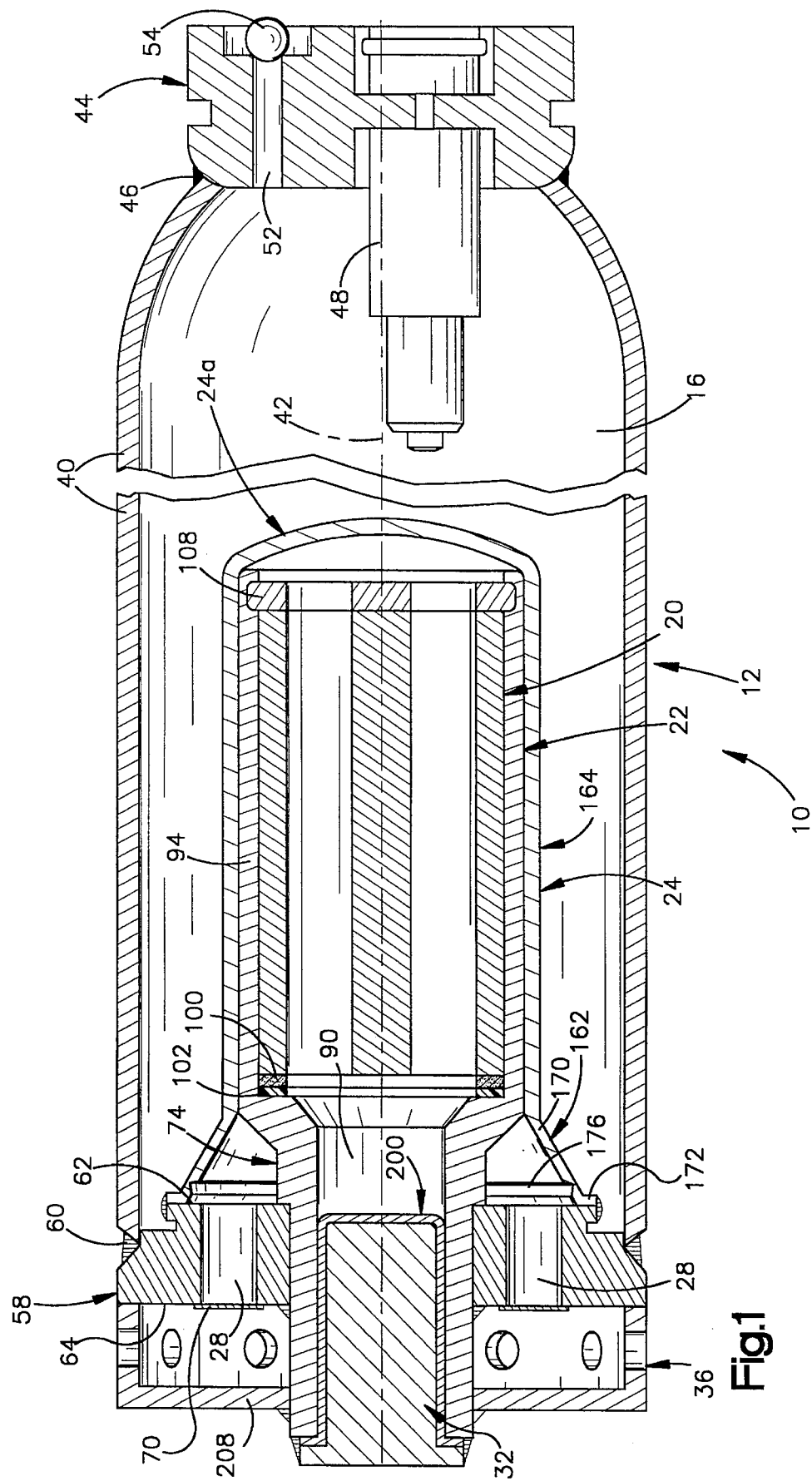
FIG. 1 is a sectional view of an inflator assembly constructed in accordance with the present invention.
Figure 2:
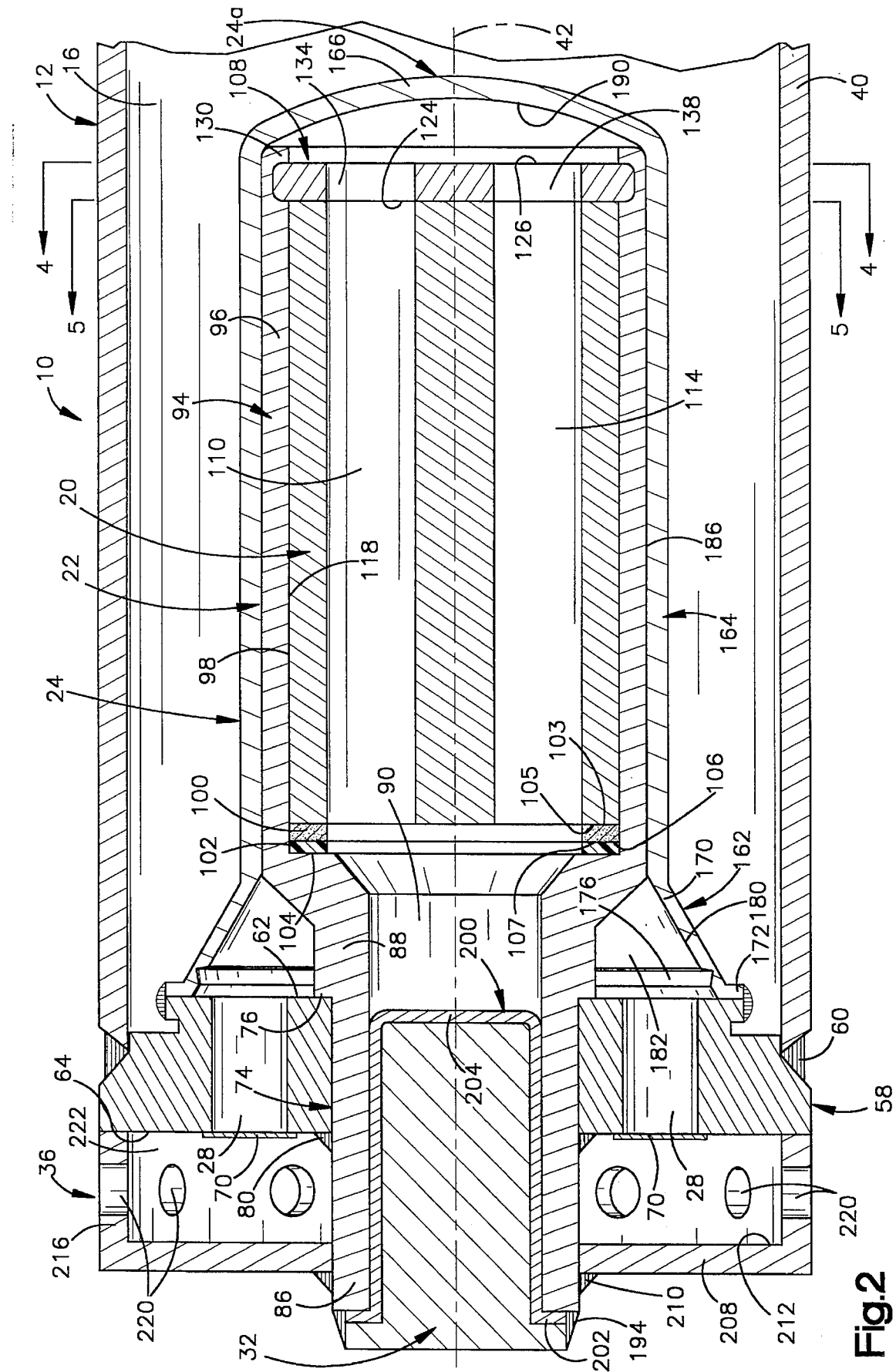
Figure 6:
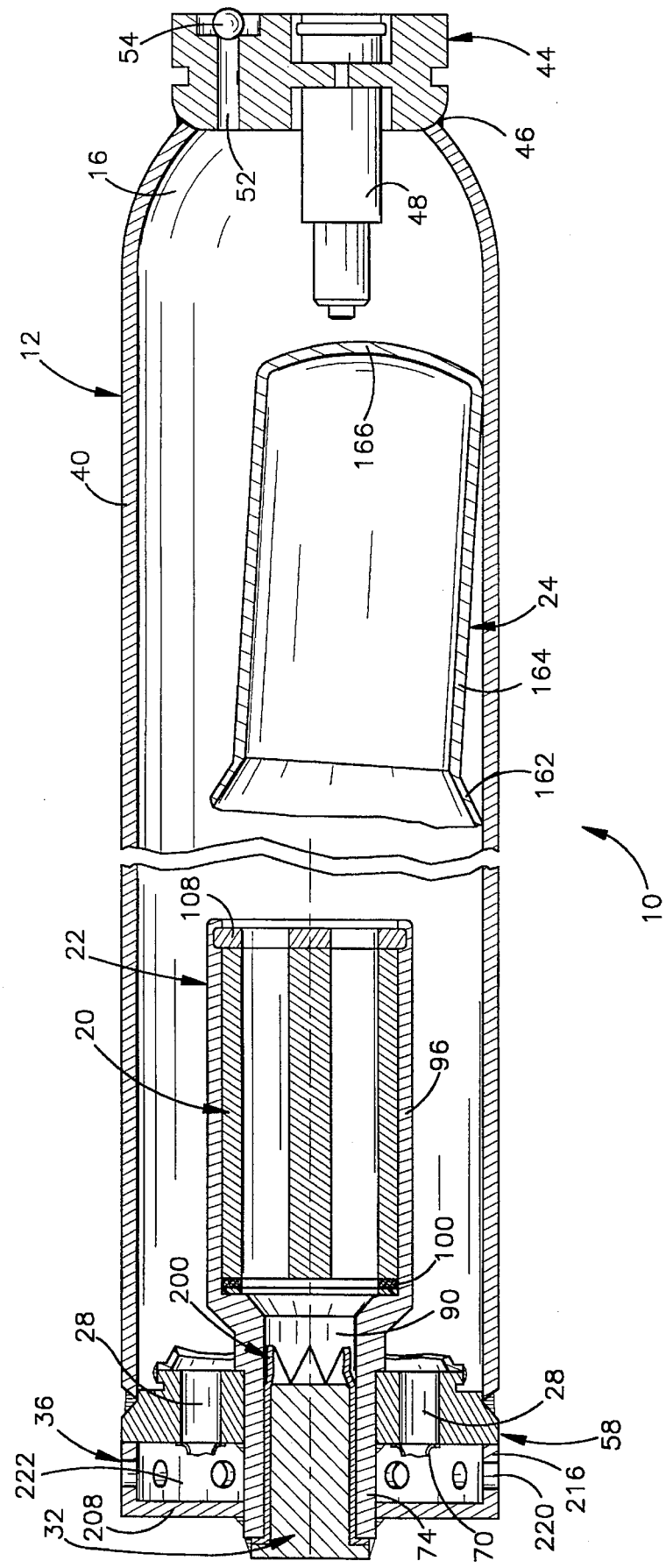
Figure 7:
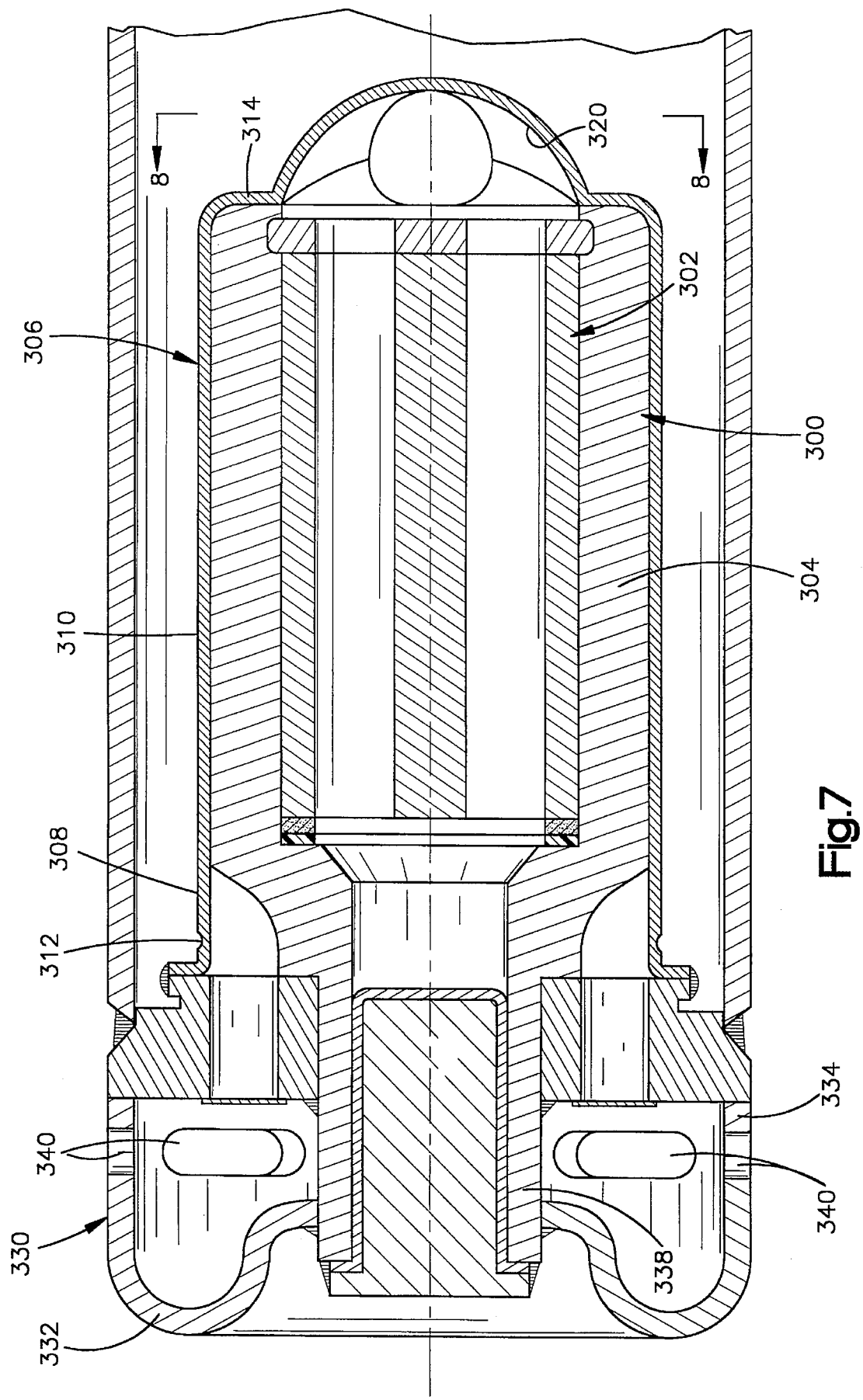
Figure 8:
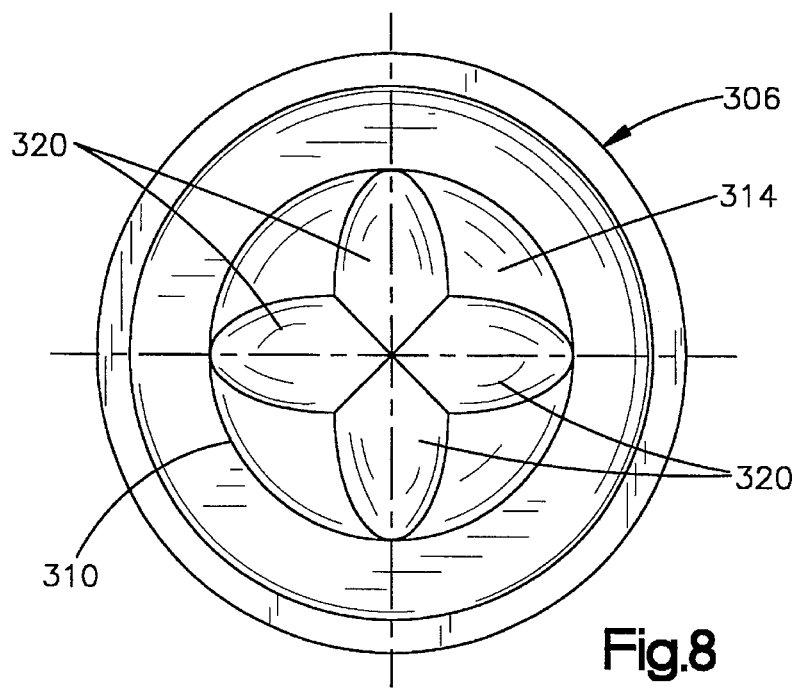

FIG. 2 is an enlarged fragmentary sectional view of a portion of the inflator assembly of FIG. 1;

FIG. 3 is an enlarged pictorial illustration of a part of the inflator assembly of FIG. 1;

FIG. 4 is a sectional view, taken approximately along the line 4—4 of FIG. 2;

FIG. 5 is a sectional view, taken approximately along the line 5—5 of FIG. 2;

FIG. 6 is a sectional view, generally similar to FIG. 1, illustrating the relationship between parts of the inflator assembly of FIG. 1 after the inflator assembly has been actuated;

FIG. 7 is a fragmentary sectional view of a portion of a second embodiment of an inflator assembly constructed in accordance with the present invention;

FIG. 8 is a view taken generally along the line 8—8 of FIG. 7; and

Figure 9:
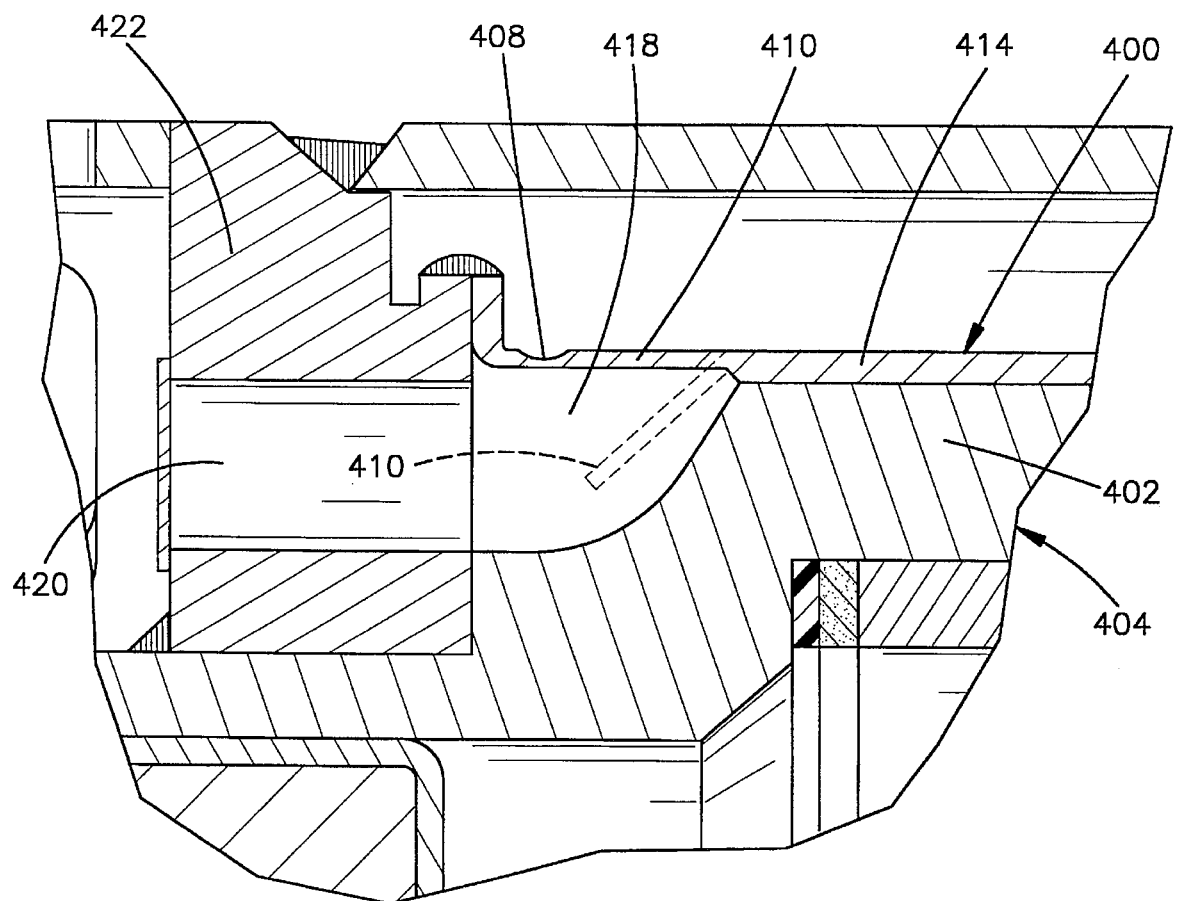

FIG. 9 is a fragmentary sectional view of a portion of a third embodiment of an inflator assembly constructed in accordance with the present invention.

DESCRIPTION OF EMBODIMENTS OF THE INVENTION

General Description

An inflator assembly 10 (FIG. 1) inflates a vehicle occupant restraint, such as an air bag (not shown). The inflator assembly 10 includes a generally cylindrical container 12 having a chamber 16 which holds a supply of stored gas. The stored gas is preferably 95% argon and 5% helium. The gas is stored in the container 12 at a pressure of approximately 2,000 to 3,500 psi. Other gases could be stored in the container 12, and the gases could be stored at different pressures. For example, air or nitrogen could be stored in the container 12.

A cup shaped closure member 24 blocks gas flow from the chamber 16 through a plurality of discharge passages 28. The cup shaped closure member 24 has a closed end 24a and an opposite open end. A quantity of material which produces pressure when at least partially ignited is disposed in a housing 22. The quantity of material is preferably a body 20 of ignitable material which extends into the cup shaped closure member 24. An igniter 32 is also disposed within the housing 22.

When an air bag is to be inflated to restrain movement of an occupant of a vehicle, the igniter 32 is activated to ignite the body 20 of ignitable material. Ignition of the body 20 of ignitable material produces combustion products which apply pressure against the closed end 24a of the closure member 24. The pressure applied to the closed end 24a of the closure member 24 breaks the closure member and moves it away from the discharge passages 28, as shown in FIG. 6. The stored gas and the combustion products from the body 20 of ignitable material then flow from the chamber 16 through the discharge passages 28 into a diffuser 36. The gas flows from the diffuser 36 into the air bag to inflate the air bag which restrains movement of an occupant of a vehicle in a known manner.

Container

The container 12 (FIG. 1) includes a cylindrical one-piece steel side wall 40. The side wall 40 has a longitudinal central axis which is coincident with a longitudinal central axis 42 of the container 12. The container 10 also includes a one-piece circular steel end wall 44 which is connected with the right (as viewed in FIG. 1) end of the side wall 40 at an annular weld 46. A pressure sensor 48 is mounted on the end wall 44 to sense the fluid pressure in the chamber 16. A fill passage 52 is formed in the end wall 44 and is closed by a steel ball 54 which is welded in place. The circular end wall 44 is coaxial with the side wall 40. The central axis 42 of the container 12 extends through the center of the end wall 44.

A circular steel end wall 58 is connected with the left (as viewed in FIG. 1) end of the side wall 40 by an annular weld 60. The left end wall 58 is disposed in a coaxial relationship with the right end wall 44 and the side wall 40 of the container 12. The end wall 58 has parallel inner and outer, radially extending side surfaces 62 and 64. Inner side surface 62 is presented toward the interior of the container 12, while the outer side surface 64 is presented away from the interior of the container. The weld 60 connects the left (as viewed in FIG. 1) end of the side wall 40 with the end wall 58 at a location intermediate the inner and outer side surfaces 62 and 64.

The discharge passages 28 are formed in the end wall 58. The discharge passages 28 have cylindrical configurations with central axes which extend parallel to the central axis 42 of the container 12. The discharge passages 28 are arranged in an annular array about the central axis 42 of the container 12. Although only two discharge passages 28 are shown in FIG. 1, it should be understood that there are a plurality of discharge passages formed in the end wall 58.

An annular metal foil seal 70 is secured to the outer side surface 64 of the end wall 58 across the ends of discharge passages 28. The metal foil seal 70 is secured to the outer side surface 64 of the end wall 58 by a suitable adhesive. The seal 70 blocks the conduction of moisture from the environment around the inflator assembly 10 through the discharge passages 28.

Housing

The housing 22 encloses the body 20 of ignitable material. The housing 22 has a central axis which is coincident with the central axis 42 of the container 12. The housing 22 includes a tubular base section 74 (FIG. 2) which extends through the end wall 58 of the container 12. The base section 74 is generally circular in transverse section. An annular, radially extending shoulder 76 on the outer surface of the base section 74 abuts the inner side surface 62 of the end wall 58. An annular weld 80 connects the base section 74 of the housing 22 with the outer side surface 64 of the end wall 58.

The base section 74 of the housing 22 has a cylindrical outer end portion 86 which extends axially outward, that is, away from the interior of the container 12 and toward the left as viewed in FIG. 2, from the end wall 58. An inner end portion 88 of the base section 74 extends axially inward, that is, toward the interior of the container 12 and to the right as viewed in FIG. 2, from the end wall 58. A cylindrical passage 90 extends through the center of the base section 74. The igniter 32 is located in the passage 90.

A tubular main section 94 of the housing 22 is formed as one piece with the base section 74. The main section 94 of the housing 22 includes a cylindrical side wall 96. The side wall 96 and base section 74 have central axes which are coincident with the central axis 42 of the container 12. The cylindrical side wall 96 has a relatively large outer diameter. Therefore, the base section 74 flares radially outwardly to the side wall 96 of the main section 94 of the housing 22.

The main section 94 of the housing 22 has a cylindrical housing chamber 98 (FIG. 2). The housing chamber 98 has a central axis which is coincident with the central axis 42 of the container 12. The housing chamber 98 contains an annular ring 100 of auto-ignition material adjacent to one end of the body 20 of ignition material. An annular cushioning ring 102 is disposed between the ring 100 of auto-ignition material and an annular end surface or shoulder 104 on the housing 22.

The cushioning ring 102 rests against the radially extending shoulder 104, which is formed on the axially inner end of the base section 74 of the housing 22. The cushioning ring 102 has a central axis which is coincident with the central axis 42 of the container 12. The cushioning ring 102 is formed of a suitable polymeric material, such as silicone.

The annular ring 100 of auto-ignition material is disposed in a coaxial relationship with the cushioning ring 102 and the body 20 of ignitable material. The ring 100 of auto-ignition material is preferably a stabilized nitrocellulose composition, such as IMR 4895 which is commercially available from E. I. DuPont de Nemours & Co. The auto-ignition material ignites at a temperature of about 350° F. A flat annular side surface 103 of the ring 100 of auto-ignition material is disposed in abutting engagement with a flat end surface 105 on the body 20 of ignitable material. Similarly, a parallel flat annular side surface 106 on the ring 100 of auto-ignition material is disposed in abutting engagement with a flat annular side surface 107 on the cushioning ring 102.

The body 20 of ignitable material has a multi-lobe cross-sectional configuration (FIG. 5) and extends from the cushioning ring 102 (FIG. 2) through the housing chamber 98 to a circular end wall 108 of the housing 22. A plurality of straight cylindrical passages 110, 112, 114, and 116 (FIG. 5) extend between axially opposite ends of the body 20 of ignitable material (FIG. 2). The passages 110, 112, 114 and 116 have longitudinal central axes which are parallel to the central axis 42 of the container 12.

The body 20 of ignitable material has a continuous, curved outer side surface 118 (FIG. 5) which defines and extends around four lobes through which the passages 110, 112, 114 and 116 extend. Although the body 20 of ignitable material has been illustrated in FIG. 5 as having four lobes and passages 110, 112, 114 and 116, it is contemplated that the body of ignitable material could be formed with a different configuration if desired. The body 20 of ignitable material is a pyrotechnic material which may have many different compositions. For example, the body 20 of ignitable material may have the composition disclosed in U.S. Pat. No. 5,131,680.

The end wall 108 (FIGS. 2, 3 and 4) of the housing 22 is a powdered metal part, but may be made from an alloy steel. The end wall 108 has a flat circular, radially extending inner side surface 124 which abuttingly engages one end of the body 20 of ignitable material (FIG. 2). The end wall 108 also has a flat circular, radially extending outer side surface 126 which extends parallel to the inner side surface 124. An annular crimp or rim 130 at the right (as viewed in FIG. 2) end of the cylindrical housing side wall 96 engages the outer side surface 126 of the end wall 108 to hold the end wall in place in the housing 22. A plurality of passages are provided in the end wall 108 to conduct combustion products which are produced upon ignition of the body 20 of ignitable material. Specifically, the end wall 108 has four cylindrical main passages 134, 136, 138 and 140 (FIGS. 3 and 4) which extend through the end wall 108 and are aligned with the passages 110, 112, 114 and 116 (FIG. 5) in the body 20 of ignitable material.

A plurality of secondary passages 144, 146, 148 and 150 (FIGS. 3 and 4) also extend through the end wall 108. The main passages 134, 136, 138 and 140 through the end wall 108 conduct combustion products from the passages 110, 112, 114 and 116 (FIG. 5) in the body 20 of ignitable material. The secondary passages 144, 146, 148 and 150 (FIGS. 3 and 4) conduct combustion products from passages formed between the housing 22 and spaces between the lobes in the body 20 of ignitable material (FIG. 5).

Two diametrically opposed projections 154 and 156 extend from the inner side surface 124 of the end wall 108 (FIG. 3). The projections 154 and 156 engage the outer side surface 118 of the body 20 of ignitable material between adjacent lobes (FIG. 5). Engagement of the projections 154 and 156 with the body 20 of ignitable material positions the end wall 108 and body of ignitable material relative to each other so that the main passages 134, 136, 138 and 140 (FIG. 3) are axially aligned with the passages 110, 112, 114 and 116 (FIG. 5) through the body 20 of ignitable material. The secondary openings 146 and 150 extend through the projections 154 and 156.

Closure Member

The closure member 24 (FIG. 2) blocks the discharge passages 28 and encloses the main section 94 of the housing 22. The closure member 24, as discussed above, has a generally cup shaped configuration and is formed as one piece of a suitable material, such as low carbon steel or annealed stainless steel. The closure member 24 has a central axis which is coincident with the central axis 42 of the container 12.

The closure member 24 includes a skirt section 162 which is connected to the flat circular inner side surface 62 of the end wall 58 (FIG. 2). The closure member 24 has a cylindrical side wall 164 which is connected to and is coaxial with the skirt section 162. The side wall 164 encloses the main section 94 of the housing 22 and the body 20 of ignitable material. An imperforate circular end wall 166 of the closure member 24 is connected with the right (as viewed in FIG. 2) end portion of the side wall 164 and closes the end 24a of the cup shaped closure member. The end wall 166 extends across the right (as viewed in FIG. 2) end of the housing 22.

The skirt section 162 has a side wall 170 with a configuration which is a frustrum of a cone. An annular flange 172 extends radially outwardly from the left (as viewed in FIG. 2) end of the side wall 170 and is welded to the end wall 58. The annular flange 172 circumscribes the annular array of inlet openings to the discharge passages 28. The annular flange 172 is disposed in a coaxial relationship with the annular array of discharge passages 28.

The side wall 170 of the skirt section 162 extends from the main section 94 of the housing 22 to the inner side surface 62 of the end wall 58. In the embodiment of the invention illustrated in FIG. 2, the cylindrical main section 94 of the housing 22 has a outer surface which is located radially inward of the longitudinal axes of the individual discharge passages 28. Therefore, the skirt section 162 flares axially away and radially outwardly from the main section 94 of the housing 22 toward the end wall 58. However, it is contemplated that the main section 94 of the housing 22 could be formed with a somewhat larger diameter so that the skirt section 162 could be cylindrical and still circumscribe the annular array of discharge passages 28.

An annular frangible section 176 (FIG. 2) of reduced thickness is formed in the skirt section 162. The frangible section 176 is breakable under the influence of tension forces transmitted from the end wall 166 of the cup shaped closure member 24 upon ignition of the body 20 of ignitable material. The frangible section 176 is coaxial with the central axis 42 of the container 12 and extends around the base section 74 of the housing 22.

The skirt section 162 (FIG. 2) has an inner side surface 180 which cooperates with the inner side surface 62 on the end wall 58 and an outer side surface of the base section 74 to form an annular manifold chamber 182. The manifold chamber 182 extends around the base section 74 of the housing 22 and has a central axis which is coincident with the central axis 42 of the container 12. The discharge passages 28 in the end wall 58 have circular inner ends which open to the manifold chamber 182.

Prior to breaking of the frangible section 176 of the skirt section 162, the manifold chamber 182 is isolated from the stored gas in the chamber 16. Thus, the fluid pressure in the manifold chamber 182, prior to breaking of the frangible section 176, will be approximately atmospheric pressure while the stored gas in the chamber 16 will be at a pressure of, for example, 2,000 to 3,500 psi.

The tubular side wall 164 (FIG. 2) of the closure member 24 has a cylindrical inner side surface 186 which is disposed in engagement with a cylindrical outer side surface of the main section 94 of the housing 22. The inner side surface 186 of the side wall 164 is freely slidable along the outside of the housing 22 under the influence of pressure applied against the end wall 166 after ignition of the body 20 of ignitable material and breaking of the frangible section 176 of the closure member 24.

Igniter

The igniter 32 is located in the passage 90 (FIG. 2) which extends through the base section 74 of the housing 22. The igniter 32 has a cylindrical configuration. The igniter 32 is axially aligned with the left (as viewed in FIG. 2) end of the body 20 of ignitable material.

The igniter 32 is actuatable to ignite the body 20 of ignitable material. The igniter 22 has a metal casing which is connected with the outer or left (as viewed in FIG. 2) end of the base section 74 of the housing 22 by an annular weld 194. The igniter 32 includes a pyrotechnic charge which may be zirconium potassium perchlorate or $BKNO_3$ or, if desired, a different chemical composition.

The igniter 32 is connected with a sensor assembly (not shown) which detects vehicle deceleration. If the sensor assembly detects excessive vehicle deceleration, the sensor assembly completes an electrical circuit with an energy source to activate the igniter assembly 32 to effect ignition of the body 20 of ignitable material.

A one-piece seal cup 200 (FIG. 2) is disposed in the passage 90 and receives the igniter 32 to block the conduction of moisture from the environment around the inflator assembly 10 to the body 20 of ignitable material. The seal cup is formed as a single piece of metal and has a thickness of between 0.20 and 0.30 millimeters. The seal cup 200 has an annular flange 202 which is connected with the outer or left (as viewed in FIG. 2) end of the base section 74 by the weld 194. A plurality of score lines (not shown) extend diametrically across the right (as viewed in FIG. 2) end wall 204 of the seal cup 200. The score lines have a depth of approximately 0.10 to 0.05 millimeters. The score lines weaken the seal cup 200 so that it is easily ruptured upon activation of the igniter 32.

Diffuser

The diffuser 36 is formed as one piece of steel. The diffuser 36 has a circular end wall 208 (FIG. 2) which extends radially outwardly from the outer end portion 86 of the base section 74 of the housing 22. The diffuser end wall 208 is connected to the base section 74 of the housing 22 by an annular weld 210. The end wall 208 of the diffuser 36 has a central axis which is coincident with the central axis 42 of the container 12.

The end wall 208 has a flat circular, radially extending inner side surface 212. The surface 212 on the end wall 208 extends parallel to and is spaced from the flat circular outer side surface 64 on the end wall 58.

A cylindrical side wall 216 (FIG. 2) of the diffuser 36 is formed as one piece with the end wall 208 and extends axially from the outer periphery of the end wall. The outer diameter of the cylindrical side wall 216 of the diffuser 36 is the same as the diameter of the outer side surface 64 on the end wall 58. The cylindrical side wall 216 of the diffuser 36 is welded to the outer side surface 64 of the container end wall 58.

An annular array of radially extending cylindrical passages 220 is formed in the side wall 216 of the diffuser 36. The combined flow area of the passages 220 is larger than the combined flow area of the passages 28 in the end wall 58. The radially extending passages 220 are connected in fluid communication with an annular diffuser chamber 222 which is defined by the diffuser 36, the container end wall 58, and the base section 74 of the housing 22. The diffuser chamber 222 extends around the outer end portion 86 of the base section 74 of the housing 22. The diffuser passages 220 are also connected in fluid communication with the inside of an air bag (not shown).

The body 20 of ignitable material, housing 22, closure member 24, igniter 32 and diffuser 36 are all connected with the end wall 58 of the container 12. By connecting the housing 22, closure member 24 and diffuser 36 to the end wall 58, these components of the inflator assembly 10 can be mounted as a unit on the side wall 40 of the container. The igniter 32 can be connected to the housing 22 after the end wall 58, housing 22, closure member 24 and diffuser 36 have been connected as a unit with the side wall 40 of the container 12.

Operation

Upon the occurrence of sudden vehicle deceleration, the deceleration sensor (not shown) completes an electrical circuit to activate the igniter 32 (FIG. 2) in a known manner. This results in ignition of a pyrotechnic charge in the igniter 32. Burning of the pyrotechnic charge in the igniter 32 produces pressure which ruptures the relatively thin seal cup 200.

Rupturing the seal cup 200 enables hot initiating gases to flow through the passage 90 in the base section 74 of the housing 22. The hot initiating gases engage the left (as viewed in FIG. 2) end portion of the body 20 of ignitable material. The initiating gases ignite the body 20 of ignitable material.

Upon ignition of the body 20 of ignitable material, combustion products are conducted through the end wall 108 of the housing 22. These combustion products apply pressure against the end wall 166 of the closure member 24. The pressure applied against the end wall 166 of the closure member 24 results in the transmission of tensile forces through the side wall 164 of the closure member to the skirt section 162 of the closure member. These tensile forces are effective to break the frangible section 176 (FIG. 2) of the skirt section 162.

Upon breaking of the frangible section 176 of the skirt section 162, the fluid pressure applied by the combustion products from the burning body 20 of ignitable material moves the closure member 24 away from the end wall 58 of the container 12 toward the opposite end wall 44 (see FIG. 6). Thus, the fluid pressure applied against the end wall 166 (FIG. 2) of the closure member 24 moves the closure member toward the right (as viewed in FIG. 2). This movement of the closure member 24 is initially guided by sliding movement of the side wall 164 of the closure member along the side wall 96 of the housing 22. The closure member 24 then separates from the housing 22 and comes to rest adjacent to the end wall 44 of the container 12 (FIG. 6).

As soon as the frangible section 176 in the skirt section 162 (FIG. 2) breaks, the stored gas in the chamber 16 flows into the annular manifold chamber 182. The gas pressure transmitted from the manifold chamber 182 through the discharge passages 28 ruptures the seal 70 (FIGS. 2 and 6). Gas then flows from the chamber 16 through the discharge openings 28 into the diffuser chamber 222.

When the gas enters the diffuser chamber 222, it impinges against the end wall 208 of the diffuser 36. The end wall 208 of the diffuser 36 directs the gas flow radially outwardly toward the openings 220 in the side wall 216 of diffuser 36. The gas flows through the openings 220 to the air bag.

The combustion products produced by burning the body 20 of ignitable material flows into chamber 16. The relatively hot combustion products mix with heat and the supply of In FIG. 6 of the drawings, the igniter 32, the ring 100 of auto-ignition material, and the body 20 of ignitable material are illustrated in their condition prior to actuation of the inflator assembly 10. However, it should be understood that the igniter 32 is destroyed, and the ring 100 of auto-ignition material and body 20 of ignitable material are consumed during actuation of the inflator assembly 10.

Second Embodiment

FIGS. 7 and 8 illustrate a second embodiment of the present invention. In the embodiment of FIGS. 7 and 8, a housing 300 encloses a body 302 of ignitable material. The housing 300 differs from the housing 22 illustrated in FIG. 2 in that the housing 300 has a cylindrical main section 304 with a larger outer diameter than the main section 94 of the housing 22 of the embodiment of FIG. 2.

A cup shaped closure member 306 (similar to closure member 24 of the embodiment of FIG. 3) encloses the main section 304 of the housing 300. Due to the relatively large outer diameter of the main section 304 of the housing 300 (FIG. 7), the closure member 306 has a skirt section 308 which is formed as a continuation of a cylindrical side wall 310 of the closure member 306. An annular frangible section 312 is formed in the skirt section 308. The frangible section 312 is breakable under the influence of tension forces transmitted from an end wall 314 through the side wall 310 and through the skirt section 308 of the closure member 306.

The end wall 314 of the closure member 306 is formed with a plurality of projections 320 which extend axially away from the side wall 310 of the closure member 306 and radially outward from a center of the end wall 314. The projections 320 increase the structural rigidity of the end wall 314 of the closure member 306.

In the embodiment of the invention illustrated in FIG. 7, the diffuser 330 has an end wall 332 which is formed as one piece with a generally cylindrical side wall 334. The end wall 332 of the diffuser projects axially beyond the housing 300, toward the left as viewed in FIG. 7, to form a shield to protect an outer end portion 338 of the housing 300. If the inflator assembly should be dropped, for example, the outwardly projecting end wall 332 of the diffuser will help protect the igniter and outer end portion 338 of the housing against striking the floor or other object upon which the inflator assembly is dropped.

Also, in the embodiment of the invention illustrated in FIG. 7, generally oblong passages 340 are formed in the side wall 334 of the diffuser 330 instead of the circular openings of the embodiment of FIG. 2.

Third Embodiment

In the embodiment of the invention illustrated in FIG. 9, a cup shaped closure member 400 has the same general construction and configuration as the closure member 306 of FIG. 7. The closure member 400 extends around a cylindrical main section 402 of a housing 404. A frangible section 408 is formed in a skirt portion 410 of the closure member 400. The skirt portion 410 and a side wall 414 of the closure member have approximately the same outer diameter and thus form a cylinder as in the embodiment of FIG. 7. The skirt portion 410 has a radial thickness which is less than the radial thickness of the side wall 414 of the closure member 400. The reduced thickness of the skirt portion 410 enables the skirt portion to be deflected radially inwardly to the position shown in dashed lines in FIG. 9 upon breaking of the frangible section 408, such as by a predetermined increase in the gas pressure applied against an outer side surface of the skirt portion 410. Thus, the skirt portion 410 is deflected radially inwardly into an annular manifold chamber 418 and provides a flow area through which gas flows toward discharge passages 420 formed in an end wall 422.

If, for some reason, such as a temperature increase, the pressure of the gas stored in the inflator should become excessive, the fluid pressure of the gas against the skirt portion 410 of the closure member 400 will cause the closure member to break at the frangible section 408. The pressure applied by the gas against the reduced thickness skirt portion 410 will then deflect the skirt portion radially inwardly to the position shown in dashed lines in FIG. 9 to provide a flow area to enable the stored gas to flow through the discharge passages 420.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating a vehicle occupant restraint, said apparatus comprising:

a container for holding a supply of gas;

surface means for defining a gas discharge opening for directing gas from said container;

a quantity of pressure producing material, said quantity of pressure producing material being ignitable to produce pressure;

said container having a closure member blocking said gas discharge opening and at least partially enclosing said quantity of pressure producing material, said closure member including a breakable portion adjacent to said discharge opening, a side wall portion extending from said breakable portion and at least partially enclosing said quantity of pressure producing material, and an end wall portion connected with said side wall portion of said closure member; and igniter means for igniting said quantity of pressure producing material to create pressure against said end wall portion of said closure member to break said breakable end portion of said closure member and to move at least said side wall portion and said end wall portion of said closure member away from said discharge opening to enable gas to flow through said discharge opening toward the vehicle occupant restraint.

2. An apparatus as set forth in claim 1 wherein said breakable portion of said closure member includes an area of reduced thickness which is broken upon application of pressure against said end wall portion of said closure member.

3. An apparatus as set forth in claim wherein said container includes a longitudinally extending side wall, an end wall connected with said side wall, said surface means for defining a discharge opening defining an annular array of discharge openings in said end wall, said breakable portion of said closure member being connected with said end wall.

4. An apparatus as set forth in claim 1 wherein said quantity of pressure producing material comprises a body of ignitable material and further including seal means disposed between said igniter means and said body of ignitable material for blocking the conduction of moisture from the environment to said body of ignitable material.

5. An apparatus as set forth in claim 1 wherein said quantity of pressure producing material comprises a body of ignitable material and further including a housing at least partially disposed within said closure member, said body of ignitable material being disposed in said housing.

6. An apparatus as set forth in claim 5 wherein said side wall portion of said closure member includes surface means for slidably engaging said housing during at least a portion of the movement of said side wall portion and end wall portion of said closure member away from said discharge openings.

7. An apparatus as set forth in claim 5 wherein said housing has a cylindrical outer side surface, said side wall portion of said closure member having a cylindrical inner side surface which is disposed in engagement with said cylindrical outer side surface of said housing.

8. An apparatus as set forth in claim 5 wherein said housing includes a base portion, a side wall portion extending from said base portion and adjacent said side wall portion of said closure member, and an inner end portion opposite from said base portion, said breakable portion of said closure member extending around and being spaced from said base portion of said housing, said side wall portion of said closure member extending around and being disposed in engagement with said side wall portion of said housing, said end wall portion of said closure member extending across said inner end portion of said housing, said inner end portion of said housing including an opening through which combustion products flow from said body of ignitable material toward said end wall portion of said closure member upon ignition of said body of ignitable material.

9. An apparatus as set forth in claim 1 wherein said end wall portion of said closure member includes a plurality of projections which increase the rigidity of said end wall portion of said closure member.

10. An apparatus as set forth in claim 1 further including a housing associated with said container and said closure member and having a main portion and an outer end portion, said quantity of pressure producing material being disposed in said main portion of said housing;

diffuser means for directing a flow of gas from said discharge openings, said diffuser means including an end wall which extends axially outward of the outer end portion of said housing to shield the outer end portion of said housing against unintended engagement with objects, said diffuser means defining a diffuser chamber which extends around said outer end portion of said housing and receives gas from said discharge openings, and said diffuser means including a plurality of passages through which gas flows from said diffuser chamber toward said vehicle occupant restraint.

11. An apparatus as set forth in claim 10 wherein said end wall of said diffuser means is connected to said outer end portion of said housing.

12. An apparatus as set forth in claim 1 wherein said side wall portion of said closure member has a portion of reduced thickness adjacent to said breakable portion of said closure member, said portion of reduced thickness being inwardly deflectable toward a central axis of said closure member under the influence of an increase in the pressure of the gas in said container.

13. An apparatus as set forth in claim 1 wherein said quantity of pressure producing material comprises a body of ignitable material and further including a housing, said body of ignitable material being disposed within said housing, said housing including a side wall and an end wall connected with said side wall, said end wall having a plurality of projections which engage said body of ignitable material to locate said body of ignitable material and said end wall relative to each other.

14. An apparatus for use in inflating a vehicle occupant restraint, said apparatus comprising:

a container for holding a stored supply of gas, said container including a longitudinally extending side wall, and an end wall connected with one end of said side wall;

a housing having a base section and a main section which extend from said end wall;

a quantity of pressure producing material disposed in said main section of said housing, said quantity of pressure producing material being ignitable to produce pressure;

said end wall having surface means for defining discharge openings for directing gas from said container;

a closure member which extends between said main section of said housing and said end wall to block a flow of gas from said container through said discharge openings, said closure member being connected with said end wall at a location which is spaced from said base section, said closure member having a frangible section which extends around said base section and is breakable to enable gas to flow from said container through said discharge openings; and igniter means for igniting said quantity of pressure producing material to create pressure and effect a breaking of said frangible section of said closure member to enable gas to flow from said container through said discharge openings.

15. An apparatus as set forth in claim 14 wherein said closure member, said base section of said housing and said end wall of said container at least partially define a manifold space which extends around said base section and is connected in fluid communication with said discharge openings, said closure member being effective to block flow of the stored gas into the manifold space prior to breaking of the frangible section of said closure member, said closure member being ineffective to block flow of the stored gas into the manifold space after breaking of the frangible section of said closure member.

16. An apparatus as set forth in claim 15 wherein said closure member includes a portion of reduced thickness which is deflectable into the manifold space by gas pressure after breaking of the frangible section of said closure member.

17. An apparatus as set forth in claim 15 wherein said discharge openings are formed in said end wall of said container and are disposed in a circular array adjacent to said base section of said housing, said closure member being connected with said end wall of said container at a location which is disposed radially outward of said circular array of discharge openings.

18. An apparatus as set forth in claim 14 wherein said quantity of pressure producing material comprises a body of ignitable material, said closure member has an end wall portion which extends across an end of said main section of said housing, and said body of ignitable material being ignitable by said igniter means to provide combustion products which apply pressure against said end wall portion of said closure member to break said frangible section of said closure member.

19. An apparatus as set forth in claim 14 wherein said closure member includes a side wall portion which at least partially encloses and extends along said main section of said housing, an end wall portion connected with one end of said side wall portion and extending across an end of said main section of said housing opposite from said base section of said housing, and a skirt portion connected with a second end of said side wall portion and extending from said side wall portion along said base section of said housing to said end wall of said container, said skirt portion of said closure member having an end portion which is connected with said end wall of said container, said frangible section of said closure member being disposed in said skirt portion of said closure member.

20. An apparatus as set forth in claim 19 wherein said end wall portion, side wall portion, and skirt portion of said closure member are formed as one piece.

21. An apparatus for use in inflating a vehicle occupant restraint, said apparatus comprising:

a container for holding a supply of gas under pressure, said container including a longitudinally extending side wall and an end wall connected with one end of said side wall, said end wall including surface means for defining an array of passages which extend through said end wall;

a housing connected with and extending through said end wall of said container at a generally central location within the array of passages;

a body of ignitable material disposed in said housing, said body of ignitable material being ignitable to produce combustion products;

igniter means disposed in said housing for igniting said body of ignitable material; and diffuser means for directing a flow of gas from the passages in said first end wall, said diffuser means including an end wall connected to said housing, said diffuser means including a side wall connected to said end wall of said container outwardly of the array of passages, said side wall and end wall of said diffuser means cooperating with said end wall of said container and said housing to form a diffuser chamber which extends around a portion of said housing and receives gas from open ends of passages in said array of passages, said end wall of said diffuser means extending from said housing outwardly across the open ends of the passages to deflect gas flow from the passages toward said side wall of said diffuser means, said side wall of said diffuser means including a plurality of passages through which gas flows from said diffuser chamber.

22. An apparatus as set forth in claim 21 wherein said plurality of passages in said side wall of said diffuser means have an area which is larger than the area of the passages in said end wall of said container.

23. An apparatus as set forth in claim 21 wherein said end wall of said diffuser means extends transverse to axes of the passages through said end wall of said container, said side wall of said diffuser means having a cylindrical inner side surface with a central axis which is parallel to the central axis of the passages in said end wall of said container.

24. An apparatus as set forth in claim 21 wherein said housing has a tubular base portion which extends through said end wall of said container and a tubular main portion spaced from said end wall of said container, said tubular main portion of said housing having a first cross-sectional area in a plane perpendicular to a longitudinal axis of said housing, said tubular base portion of said housing having a second cross-sectional area in a plane perpendicular to the longitudinal axis of said housing, said first cross-sectional area being larger than said second cross-sectional area.

25. An apparatus as set forth in claim 21 wherein said housing includes a side wall which extends along a side portion of said body of ignitable material and an end wall which is connected with said side wall of said housing, said end wall of said housing having a plurality of passages through which gas from said body of ignitable material is conducted upon ignition of said body of ignitable material, said end wall of said housing having a plurality of projections which extend between the side portion of said body of ignitable material and said side wall of said housing and which engage the side portion of said body of ignitable material to locate said body of ignitable material and said end wall of said housing relative to each other.

26. An apparatus as set forth in claim 21 further including seal means disposed in said housing between said igniter means and said body of ignitable material for blocking the conduction of moisture from the environment around said apparatus to said body of ignitable material.

27. An apparatus as set forth in claim 21 further including seal means disposed in engagement with an outer side surface of said end wall of said container for blocking the conduction of moisture from the environment around said apparatus through the passages in said array of passages.

28. An apparatus as set forth in claim 21 further including closure means connected with said container for blocking a flow of gas through the passages in said end wall of said container, said closure means being breakable to enable gas to flow through the passages in said end wall of said container.

29. An apparatus as set forth in claim 28 wherein said closure means is connected to said end wall of said container at a location outwardly of the passages in said end wall of said container, said closure means, said housing and said end wall of said container at least partially defining a manifold space which extends around said housing and which is in fluid communication with the passages in said end wall of said container, said closure member being effective to block flow of the stored gas into the manifold space prior to breaking of said closure means, said closure means being ineffective to block flow of the stored gas into the manifold space after breaking of said closure means.

30. An apparatus as set forth in claim 29 wherein said end wall of said diffuser means has a central portion which is connected to an axial outer end portion of said housing and includes a rim portion which extends axially outward of the axial outer end portion of said housing to shield said housing against unintended force being applied thereto.

31. An apparatus for use in inflating a vehicle occupant restraint, said apparatus comprising:

a container for holding a supply of gas under pressure, said container including a longitudinally extending side wall and an end wall connected with one end of said side wall, and surface means for defining a plurality of passages which extend through said end wall, said side wall of said container being fixedly secured to said end wall;

a housing connected to a central portion of said end wall;

a body of ignitable material disposed in said housing, said body of ignitable material being ignitable to produce combustion products;

closure means connected to said end wall for blocking a flow of gas through said passages, said closure means being breakable to enable gas to flow through said passages upon ignition of said body of ignitable material, said closure means having a circular end portion which is connected with said end wall of said container and a central portion which at least partially encloses a portion of said housing;

igniter means disposed in said housing for igniting said body of ignitable material; and diffuser means connected to said end wall for diffusing a flow of gas from the passages, said diffuser means having passages for directing a flow of gas from said diffuser means in a direction transverse to the direction of flow of gas through said plurality of passages.

32. An apparatus for use in inflating a vehicle occupant restraint, said apparatus comprising:

a container for holding a supply of gas under pressure, said container including a longitudinally extending side wall and an end wall connected with one end of said side wall, and surface means for defining a plurality of passages which extend through said end wall, said side wall of said container being fixedly secured to said end wall;

a housing connected to a central portion of said end wall;

a body of ignitable material disposed in said housing, said body of ignitable material being ignitable to produce combustion products;

closure means connected to said end wall for blocking a flow of gas through said passages, said closure means being breakable to enable gas to flow through said passages upon ignition of said body of ignitable material, said closure means including a breakable end portion connected with said end wall of said container at a location outwardly of said passages through said end wall of said container, a side wall portion extending from said breakable end portion and at least partially enclosing said housing, and an end wall portion connected with said side wall portion and extending across an end of said housing;

igniter means disposed in said housing for igniting said body of ignitable material; and diffuser means connected to said end wall for diffusing a flow of gas from the passages, said diffuser means having passages for directing a flow of gas from said diffuser means in a direction transverse to the direction of flow of gas through said plurality of passages.

33. An apparatus for use in inflating a vehicle occupant restraint, said apparatus comprising:

a container for holding a stored supply of gas;

a body of ignitable material, said body of ignitable material including an end surface and a side surface extending from said end surface;

a housing enclosing said body of ignitable material, said housing including a side wall which extends along the side surface of said body of ignitable material and an end wall which is connected with said side wall, said end wall having a plurality of passages through which combustion products from said body of ignitable material is conducted upon ignition of said body of ignitable material, said end wall having a plurality of projections which extend between the side surface of said body of ignitable material and said side wall of said housing and which engage the side surface of said body of ignitable material to locate said body of ignitable material and said end wall relative to each other, at least some of said passages in said end wall of said housing extending through said projections to enable combustion products to flow from said body of ignitable material; and igniter means for igniting said body of ignitable material to produce combustion products which flow through the passages in said end wall of said housing to heat the stored supply of gas in said container.

34. An apparatus for use in inflating a vehicle occupant restraint, said apparatus comprising:

a container for holding a stored supply of gas;

a body of ignitable material, said body of ignitable material including an end surface and a side surface extending from said end surface;

a housing enclosing said body of ignitable material, said housing including a side wall which extends along the side surface of said body of ignitable material and an end wall which is connected with said side wall, said end wall having a plurality of passages through which combustion products from said body of ignitable material is conducted upon ignition of said body of ignitable material, said end wall having a plurality of projections which extend between the side surface of said body of ignitable material and said side wall of said housing and which engage the side surface of said body of ignitable material to locate said body of ignitable material and said end wall relative to each other, said side surface defining multiple lobes of said body of ignitable material, said projections being disposed between adjacent lobes of said body of ignitable material; and igniter means for igniting said body of ignitable material to produce combustion products which flow through the passages in said end wall of said housing to heat the stored supply of combustion products in said container.

35. An apparatus for use in inflating a vehicle occupant restraint, said apparatus comprising:

a container for holding a stored supply of gas;

a body of ignitable material, said body of ignitable material including an end surface and a side surface extending from said end surface;

a housing enclosing said body of ignitable material, said housing including a side wall which extends along the side surface of said body of ignitable material and an end wall which is connected with said side wall, said end wall having a plurality of passages through which combustion products from said body of ignitable material is conducted upon ignition of said body of ignitable material, said end wall having a plurality of projections which extend between the side surface of said body of ignitable material and said side wall of said housing and which engage the side surface of said body of ignitable material to locate said body of ignitable material and said end wall relative to each other;

igniter means for igniting said body of ignitable material to produce combustion products which flow through the passages in said end wall of said housing to heat the stored supply of combustion products in said container; and a body of auto-ignition material disposed in said housing adjacent to an end portion of said body of ignitable material opposite from said end wall of said housing, said body of auto-ignition material being ignitable at a lower temperature than said body of ignitable material.

36. An apparatus for use in inflating a vehicle occupant restraint, said apparatus comprising:

a container for holding a stored supply of gas;

a body of ignitable material, said body of ignitable material including an end surface and a side surface extending from said end surface;

a housing enclosing said body of ignitable material, said housing including a side wall which extends along the side surface of said body of ignitable material and an end wall which is connected with said side wall, said end wall having a plurality of passages through which combustion products from said body of ignitable material is conducted upon ignition of said body of ignitable material, said end wall having a plurality of projections which extend between the side surface of said body of ignitable material and said side wall of said housing and which engage the side surface of said body of ignitable material to locate said body of ignitable material and said end wall relative to each other;

igniter means for igniting said body of ignitable material to produce combustion products which flow through the passages in said end wall of said housing to heat the stored supply of combustion products in said container;

surface means for defining discharge openings for directing combustion products from said container; and a closure member at least partially enclosing said housing, said closure member blocking a flow of gas from said container through said discharge openings, said closure member including a breakable portion, a side wall portion extending from said breakable portion along said side wall of said housing, and an end wall portion connected with said side wall portion of said closure member and extending across said end wall of said housing, said body of ignitable material being ignitable by said igniter means to produce combustion products which are conducted through the passages in said end wall of said housing and which apply pressure against said end wall of said closure member to break said breakable portion of said closure member and to move at least said side wall portion and said end wall portion of said closure member away from said housing thereby to enable combustion products from said body of ignitable material and the stored supply of combustion products to flow through said discharge openings toward the inflatable occupant restraint.

* * * * *

UNITED STATES PATENT AND TRADEMARK OFFICE
CERTIFICATE OF CORRECTION

PATENT NO.  : 5,584,504
DATED       : December 17, 1996
INVENTOR(S) : Jess A. Cuevas, Craig M. Fischer, John P. O'Loughlin and John D. Skouson It is certified that error appears in the above-indentified patent and that said Letters Patent is hereby corrected as shown below:

Column 10, line 3, after "claim" insert --1--.

Signed and Sealed this

Third Day of June, 1997

Attest:

BRUCE LEHMAN

Attesting Officer

Commissioner of Patents and Trademarks